April 4, 1950     W. F. MOORE     2,502,874

SPINDLE MOUNTING FOR HIGH SPEEDS

Filed April 29, 1948

INVENTOR
WILLIS F. MOORE
ATTYS

Patented Apr. 4, 1950

2,502,874

UNITED STATES PATENT OFFICE 2,502,874

SPINDLE MOUNTING FOR HIGH SPEEDS

Willis F. Moore, Springfield, Vt., assignor to Bryant Chucking Grinder Company, Springfield, Vt., a corporation of Vermont Application April 29, 1948, Serial No. 23,911

3 Claims. (Cl. 308—189)

This invention relates to the mounting of high speed spindles and particularly where the spindle is mounted in ball bearings.

In the manufacture of ball bearings, one of the greatest difficulties is to make the raceway exactly parallel with the face of the bearing ring, and this difficulty is especially pronounced when the bearing is of the angular contact type. A similar difficulty arises in the manufacture of the housing with respect to the squareness of the abutment shoulder to the bore. While modern methods allow manufacture to very close tolerances, nevertheless when extremely high speeds are encountered even these close tolerances are not sufficient for satisfactory operation. Provision for taking care of this situation is thus of great importance, and is the object of the present invention. To this end the ball bearing at the inner end of the spindle has one face of its outer ring supported in full circular contact with a member which is rigidly supported at its center by an element forming a solid abutment substantially in the axis of the spindle and taking end thrust from means which loads the bearings on the spindle. This member, however, is permitted a slight rocking motion on the element, thus allowing for slight lack of parallelism between the raceway and the face of the ball bearing's outer ring.

Figure 1:
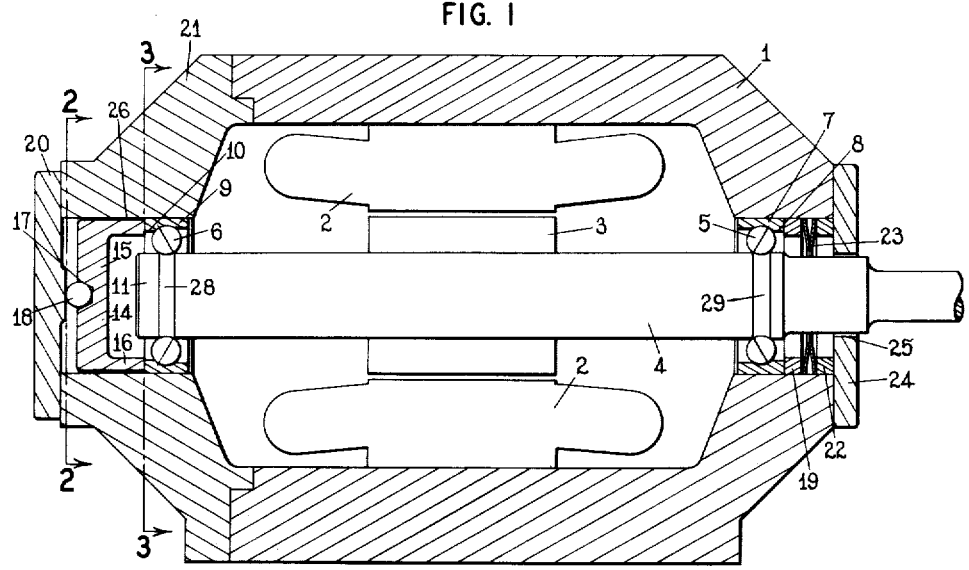

For a more complete understanding of this invention, reference may be had to the accompanying drawing in which Figure 1 is a central longitudinal sectional view through a high speed electric motor having its rotor and spindle mounted in accordance with this invention.

Figure 2:
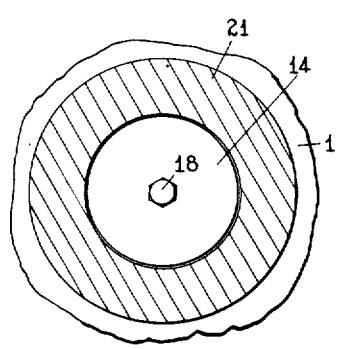
Figure 3:

Figures 2 and 3 are detail sectional views on lines 2—2 and 3—3, respectively, of Figure 1.

Referring to the drawings, at 1 is indicated a motor casing having the usual field coils 2 between which is rotatable the rotor 3 carried by the spindle or shaft 4. This shaft 4 is journaled in portions of the motor casing in a pair of reversely positioned angular contact ball bearings 5 and 6. The outer raceway 7 of the ball bearing 6 has its small diameter portion 8 outwardly of the balls of the bearing and similarly the ball bearing 6 has an outer raceway 9 provided with a small diameter portion 10 positioned toward the end 11 of the shaft 4. The outer raceway 9 is engaged by a member 14 which has a portion 15 extending across the axis of the shaft 4 and a marginal axially extending flange 16 which engages against the outer face of the outer raceway 9 circumferentially thereof in full circular contact. The outer face of the portion 15 is provided with a recess 17 in which is positioned an element 18, shown as a ball, which engages the inner face of a wall member 20 which bridges across the axis of the rotor shaft 4 spaced from the member 14. The wall member 20 is suitably secured to an end cap 21 for the motor.

Means are provided for loading the shaft 4 both radially and axially, and as shown this means comprises a pair of rings 19 and 22 between which are positioned a pair of reversely positioned Belleville springs 23, this assembly of rings 19 and 22 and springs being held between the outer raceway 7 and an end wall member 24 secured to the motor casing and having a central opening 25 for the passage of the spindle or shaft 4. The rings 19 and 22 and interposed Belleville springs being held between the end wall 24 and the outer ball bearing ring, produce an axial thrust on the bearing 5 and consequently on the shaft 4 toward the other ball bearing 6 and cause its outer raceway 9 to press against the member 14 and the member 14 to press the ball 18 against the end wall 20. This ball 18 is substantially in the axis of the shaft 4 and the member 14 is sufficiently smaller in diameter than the bore 26 of the cap 21 within which it is placed so that this member is permitted a slight universal rocking motion sufficient to equalize any small inaccuracies in the positioning of the raceways in the bearing rings. The inner raceway for each of the ball bearings 5 and 6, as shown, comprise grooves 28 and 29, respectively, formed in the periphery of the shaft 4.

From the foregoing description of an embodiment of this invention it should be evident to those skilled in the art that various changes and modifications might be made without departing from the spirit or scope of this invention.

I claim:

1. In combination, a shaft, spaced reversely positioned angular contact ball bearings in which said shaft is journaled, a member extending across the axis of said shaft beyond one end thereof and bearing circumferentially on the adjacent face of the outer raceway of the adjacent ball bearing, a wall extending across the axis of said shaft outwardly of said member, an element positioned between said wall and member and bearing on said member substantially in the axis of said shaft and about which said member may rock, and means loading said bearings in a direction to press said member against said element and said element against said wall.

2. In combination, a shaft, spaced reversely positioned angular contact ball bearings in which said shaft is journaled, a member extending across the axis of said shaft beyond one end thereof and bearing circumferentially on the adjacent face of the outer raceway of the adjacent ball bearing, said member having a depression in its outer face substantially in the axis of said shaft, a ball in said depression, a wall extending across the axis of said shaft outwardly of said member, and means for loading said shaft axially to press said ball against said wall.

3. In combination, a shaft, spaced reversely positioned angular contact ball bearings in which said shaft is journaled, a member extending across the axis of said shaft beyond one end thereof and bearing circumferentially on the adjacent face of the outer raceway of the adjacent ball bearing, said member having a depression in its outer face substantially in the axis of said shaft, a ball in said depression, a wall extending across the axis of said shaft outwardly of said member, means engaging the outer raceway of the other of said bearings effective to press said outer raceway so engaged axially toward the other raceway, the other of said raceways against said member, said member against said ball, and said element against said wall.

WILLIS F. MOORE.

REFERENCES CITED

The following references are of record in the file of this patent:

UNITED STATES PATENTS

| Number | Name | Date |
|---|---|---|
| 1,770,113 | Stumpf | July 8, 1930 |
| 2,126,963 | Kennedy | Aug. 16, 1938 |
| 2,193,042 | Roterberg | Mar. 12, 1940 |
| 2,352,469 | Carlson | June 27, 1944 |

FOREIGN PATENTS

| Number | Country | Date |
|---|---|---|
| 451,824 | Germany | Oct. 25, 1927 |